US008767793B2

(12) United States Patent
Wang et al.

(10) Patent No.: US 8,767,793 B2
(45) Date of Patent: Jul. 1, 2014

(54) METHOD FOR TREATING SPHEROIDAL GRAPHITE IRON AND POURING DEVICE THEREOF

(71) Applicants: Yuxin Wang, Shijiazhuang (CN); Juren Liu, Shijiazhuang (CN)

(72) Inventors: Yuxin Wang, Shijiazhuang (CN); Juren Liu, Shijiazhuang (CN)

(*) Notice: Subject to any disclaimer, the term of this patent is extended or adjusted under 35 U.S.C. 154(b) by 0 days.

(21) Appl. No.: 13/681,473

(22) Filed: Nov. 20, 2012

(65) Prior Publication Data

US 2013/0125704 A1    May 23, 2013

Related U.S. Application Data

(62) Division of application No. 12/922,091, filed on Sep. 10, 2010, now Pat. No. 8,419,821.

(30) Foreign Application Priority Data

Mar. 10, 2008  (CN) .......................... 2008 1 0054604
Mar. 9, 2009  (WO) ................ PCT/CN2009/070702

(51) Int. Cl.
*F27D 11/00* (2006.01)
*F27D 11/06* (2006.01)
*F27D 3/14* (2006.01)
*C22B 9/00* (2006.01)

(52) U.S. Cl.
USPC ................... 373/79; 373/83; 373/84; 373/93; 373/108

(58) Field of Classification Search
USPC .................................. 373/79, 83, 84, 93, 108
See application file for complete search history.

(56) References Cited

U.S. PATENT DOCUMENTS 3,203,883 A    8/1965  Maruyama et al.
3,953,308 A    4/1976  Gatellier et al.
4,744,875 A    5/1988  Blander et al.
4,829,538 A  * 5/1989  Hlawatschek et al. .......... 373/72
5,900,189 A  * 5/1999  Kawano et al. ............... 252/502

FOREIGN PATENT DOCUMENTS

CN         1034582 A      8/1989
CN       201217070 Y      4/2009
JP      2002-266047 A     9/2002

OTHER PUBLICATIONS

Written translation of SU 1686019 by Parshin et al, published Oct. 23, 1991.*
Machine translation of CN 1034582 A, published Aug. 9, 1989.
Derwent Acc. No. 1992-321613 for SU 168019 by Nazarenko et al. Published Oct. 23, 1991.
Parshin et al. SU 1686019 A1. published Dec. 23, 1991. English translation.

* cited by examiner

*Primary Examiner* — George Wyszomierski
*Assistant Examiner* — Tima M McGuthry Banks
(74) *Attorney, Agent, or Firm* — McDermott Will & Emery LLP

(57) ABSTRACT

A method for treating spheroidal graphite iron includes the step: pouring molten spheroidal graphite iron into a pouring electrical furnace (1); covering the molten spheroidal graphite iron (5) with alkali slag (6) which is melted at high temperature and rich in alkali earth metal ion, rare earth metal ion, or mixture of them; connecting the molten spheroidal graphite iron (5) with the negative pole of the direct current source by one pole (7); connecting the alkali slag (6) with the positive pole of the direct current source by another pole (4), treating the molten spheroidal graphite iron (5) with the alkali slag (6) which is used as electrolyte. The method can prevent the spheroidized fading velocity of the spheroidal graphite iron. The pouring electrical furnace can be used for treating the molten spheroidal graphite iron.

8 Claims, 2 Drawing Sheets

METHOD FOR TREATING SPHEROIDAL GRAPHITE IRON AND POURING DEVICE THEREOF

RELATED APPLICATIONS

This application is a Divisional of U.S. Application No. 12/922,091, now U.S. Pat. No. 8,419,821, filed on Sep. 10, 2010, which is a U.S. National Phase under 35 U.S.C. §371 of International Application No. PCT/CN2009/070702, filed on Mar. 9, 2009, which in turn claims the priority of a Chinese patent application with an invention tile of "Processing Method and Special Pouring Device for Avoiding Degradated Spheroidization and Pouring Tempetature Drop of Liquid Spheroidal Graphite Iron during Pouring Process", and an application number of 200810054604.9, and filed to the State Intellectual Property Office of the P.R.C. on Mar. 10 2008, and all contents thereof are incorporated herein by reference.

The present application claims the priority of a Chinese patent application with an invention title of "Processing Method and Special Pouring Device for Avoiding Degradated Spheroidization and Pouring Temperature Drop of Liquid Spheroidal Graphite Iron during Pouring Process", and an application number of 200810054604.9, and filed to the State Intellectual Property Office of the P.R.C on Mar. 10, 2008, and all contents thereof are incorporated herein by reference.

FIELD OF THE INVENTION

The present invention relates to the technical field of casting of spheroidal graphite iron, and particularly, to a processing method and special pouring device for avoiding degraded spheroidization and pouring temperature drop of liquid spheroidal graphite iron during pouring process.

BACKGROUND OF THE INVENTION

The spheroidal graphite cast iron is a casting alloy that develops from 1940s. Since the graphite is spheroidal, its mechanical properties are far better than the gray cast iron, superior to the malleable cast iron and close to the steel. In addition, it has some excellent properties not owned by the steel, e.g., fine castability, machinability, wearability, corrosion resistance and extensive thermal treatment adaptability. Therefore, from 1950s till now, the spheroidal graphite cast iron becomes the most rapidly developing casting alloy: the output of the spheroidal graphite cast iron throughout the world is only 50,000 tons in 1949, while 535,000 tons in 1960, 5 million tons in 1970, 7.6 million tons in 1980, 9.15 million tons in 1990, 13.1 million tons in 2000, and reaches 23 million tons in 2007. The application fields of the spheroidal graphite cast iron are very extensive, and counted in total weight, currently the cast tube and pipe fittings occupy about 40%, the automotive castings occupy about 35%, and other branches (ship, locomotive, diesel engine, agricultural machinery, middle pressure valve, metallurgical machinery, machine tool, hydraulic parts, hoisting and transport machinery, general machinery and nuclear fuel storage and transport apparatus) occupy about 25%. With its excellent properties, the spheroidal graphite cast iron develops rapidly around the world. Countries in the world widely use the spheroidal graphite cast iron to replace the forged steel, cast steel, malleable cast iron and common gray cast iron to manufacture various structural members, so as to save steels and machining working hours, prolong the service life, reduce the usage and maintenance cost, and hence acquire huge economic and social benefits. Presently, the annual output of the spheroidal graphite cast iron all over the world occupies a larger and larger proportion in the total output of ferrous cast metal, and becomes an important index for evaluating the developmental level of the foundry industry of one country.

However, as compared with other metal materials, the spheroidal graphite cast iron has a great "pity": the properties largely fluctuate during the process of metal solidification and forming, thus the material reliability is decreased, and particularly, for enterprises that produce products such as pipeline and automobile parts on a large scale, an outsize claim may be caused even undetected waste products of millionth occur during the entire production process, then the further development, promotion and application of the spheroidal graphite cast iron is restricted, this is because:

During the production process of the spheroidal graphite cast iron, the mechanical properties of the spheroidal graphite cast iron are mainly determined by the graphite shape formed during the solidification of the liquid iron, instead of the chemical composition such as carbon and silicon, thus the spheroidal graphite cast iron is also called as "magic" metal material having unstable production properties. Since the spheroidization of the spheroidal graphite cast iron is carried out ladle by ladle after the smelting of the liquid base iron, the liquid iron of different ladles may have different properties, and more importantly, the same ladle of liquid spheroidal graphite cast iron after a successful spheroidization will also encounter a degradated spheroidization due to unceasing "resulfurization" and magnesium vapor "escape", thus the mechanical properties of the castings poured later obviously become poor, and waste castings are produced. This greatly increases the difficulty of quality control during the factory production process, the spheroidal graphite cast iron is also regarded as unstable "low-reliability material", and its further development is then restricted. Since the liquid spheroidal graphite cast iron will continuously undergo the "degradated spheroidization", the effective pouring time is very short, and pouring is usually no longer allowed in the factory about ten minutes later when the pheroidization of a ladle of liquid spheroidal graphite cast iron is completed.

Experience shows that when the liquid spheroidal graphite cast iron is heated and insulated in the induction furnace, the electromagnetic stirring and temperature rise of the liquid iron will aggravate the "resulfurization" and magnesium vapor "escape", and the speed of the "degradated spheroidization" of the liquid iron in the furnace is obviously increased. Thus, the production lines of spheroidal graphite cast iron castings in China scarcely use the pouring electronic furnace, as a result, the phenomenon of temperature drop of the liquid iron is serious during the pouring process, the rejection rate related to the pouring temperature is high, the designed wall thickness of the casting is compelled to be increased artificially, and the material and energy are wasted. Currently in developed countries, the pouring electric furnace provided for the modeling and casting lines of automobile spheroidal graphite cast iron castings is a pressure pouring electric furnace having inert gas (argon, nitrogen) protection. Although such pouring electric furnace solves the problem of unstable pouring temperature, makes the pouring temperature stable and controllable, and prolongs the time at which the degradated spheroidization of the liquid spheroidal graphite cast iron occurs, the degradated spheroidization is not eliminated, and the amount of residual magnesium in the liquid spheroidal graphite cast iron filled into the electric furnace shall be increased to continuously compensate the consumption of nodulizer of the liquid spheroidal graphite cast iron, which not only increases the consumption of nodulizer, but also makes the furnace lining be continuously thickened due to the persistent reaction between the excessive metal magnesium in the liquid iron and the furnace lining, and shortens the maintenance and service cycle of the electric furnace lining. Thus at present, such pouring electric furnace is mainly adopted in the casting production lines where the spheroidal graphite cast iron and the gray cast iron are alternatively used, and is not suitable to enterprises that merely produce the spheroidal graphite cast iron castings. In addition, the air pressure pouring electric furnace requires the seal and automatic pressure adjustment of the furnace gas, thus the device structure is complex, the service and maintenance are difficult, and the material cost is high due to the consumption of argon or nitrogen all the year round.

SUMMARY OF THE INVENTION

The object of the present invention is to provide a processing method and a special pouring device for avoiding degradated spheroidization and pouring temperature drop of liquid spheroidal graphite cast iron during pouring process, which can solve the above problems, stabilize the pouring temperature, and completely avoid the degradated spheroidization, so as to reduce the rejection loss in the production of spheroidal graphite cast iron castings; meanwhile, the pouring electric furnace can greatly reduce the loss of residual magnesium in the liquid iron, so that the usage amount of nodulizer during spheroidization is obviously decreased, the life of the refractory material of furnace lining is prolonged, and the inert gas is no longer used or consumed, even the furnace body needs no sealing when a tilting type or stopper rod type pouring electric furnace is used, thus the worker's operations of furnace repairing and drossing are simplified, and the difficulties in operating and repairing the pouring electric furnace are decreased. The application of this technical device will have a significance for improving the reliability of spheroidal graphite cast iron, ensuring the long-term continuous and stable production of spheroidal graphite cast iron, and reducing the production cost of spheroidal graphite cast iron, and particularly, suitable to be promoted among enterprises that continuously produce spheroidal graphite cast iron castings on a large scale, such as casting production lines of automobile spheroidal graphite cast iron parts and centrifugal spheroidal graphite cast iron pipes, etc. The large-capacity pouring electric furnace using this technique can be further applied to production occasions for pouring large, heavy or super large thick-wall spheroidal graphite cast iron castings, such as large engineering structures, machine tool castings, large water pump castings, and nuclear fuel storage tanks.

The technical solution of the present invention is as follows: a processing method for avoiding degradated spheroidization and pouring temperature drop of liquid spheroidal graphite cast iron during pouring process: liquid spheroidal graphite cast iron to be poured is filled into a special pouring electric furnace device provided with a set of DC electro-slag system; high temperature molten alkali slag, which is abundant in alkali earth metal ion or rare earth metal ion, is paved above the liquid spheroidal graphite cast iron in the furnace; an upper part of the furnace body is provided with a graphite electrode inserted into a layer of molten alkali slag, an electrode connected to a DC power supply system is provided in the liquid spheroidal graphite cast iron under the level of the layer of molten alkali slag; the liquid spheroidal graphite cast iron is sealed by the high temperature molten alkali slag floating on the top thereof, so that the liquid spheroidal graphite cast iron in the furnace is completely isolated from oxygen in the atmosphere, so as to completely avoid "resulfurization" of the liquid iron; through the principle of "DC electrolytic cell", the liquid spheroidal graphite cast iron serves as a cathode, the graphite electrode inserted into the layer of molten alkali slag serves as an anode, and the molten alkali slag serves as a liquid electrolyte; a direct current is conducted after the furnace is filled with the liquid spheroidal graphite cast iron, the strength of the direct current is determined as follows according to the capacity of the electric furnace: a current equivalent of 20~50 Faraday for each tone of liquid spheroidal graphite cast iron per hour, here the low voltage large current refers to low voltage about 20V~70V commonly used in industries, and its current varies with the total power in a certain range, some electric energy is converted into chemical energy after the direct current is conducted to prevent [Mg] from being oxidized into [$Mg^{2+}$] by [$O^{2-}$] or [$S^{2-}$] residual in the liquid iron (to be noted, the parentheses "( )" in front and behind each ion or atom in this text means that the ion or atom is contained in the alkali slag, while the brackets "[ ]" in front and behind each ion or atom in this text means that the ion or atom is contained in the liquid spheroidal graphite cast iron); electrolytic reaction will occur in the high temperature alkali slag with a temperature of 1500° C.~1700° C., cations such as ($Mg^{2+}$) and ($Ca^{2+}$) in the slag directionally move towards the cathode, while anions such as ($S^{2-}$) in the slag move towards the anode; residual anions such as [$S^{2-}$] in the liquid spheroidal graphite cast iron will also float and enter the slag due to the attraction of oppositely charged electrode; these anions ($S^{2-}$) in the high temperature molten slag, and the anions ($S^{2-}$) in a small amount of high-sulfur slag brought into the high temperature molten alkali slag when the liquid iron is filled from the spheroidization ladle into the pouring furnace, may lose electrons near the anode and turn into free-state high temperature liquid sulfur $S_2$, and directly burn into gas $SO_2$ after contacting the air, so as to be continuously eliminated from the molten alkali slag; when enough amount of direct current is conducted, an electrode potential at a slag-metal interface will achieve an electro-chemical balance meeting the requirement of spheroidization technology, between the content of free-state [Mg] in the liquid iron and the content of ionic state ($Mg^{2+}$) in the slag, which restrains [Mg] atoms in the liquid spheroidal graphite cast iron from turning into [$Mg^{2+}$] cation due to electron loss and entering the slag, so as to keep the content of residual Mg in the liquid iron, and the content of Mg in the liquid iron can be increased and restored to the normal value, even if the entire content of residual Mg in the liquid iron in the pouring electric furnace decreases when a ladle of liquid iron with a low content of residual Mg and having undergone the degradated spheroidization is filled into the furnace inadvertently.

A pouring electric furnace device for the above processing method including a furnace body, a pouring tap-hole and a feeding iron-inlet provided on the furnace body, and means in sets for quantifying poured liquid iron, the structure of the furnace body may be bottom pouring type, tilting type or air pressure type, the sealed furnace uses compressed air rich in oxygen, instead of nitrogen or argon, characterized in that, an upper part of the furnace body is provided with a graphite electrode, high temperature molten alkali slag abundant in active alkaline earth metal ions such as ($Mg^{2+}$), ($Ca^{2+}$) is paved above the liquid spheroidal graphite cast iron in the furnace, an electrode is provided in the liquid spheroidal graphite cast iron, a lower end of the graphite electrode is always inserted into the alkali slag; a DC power supply system is provided so that an upper part of the graphite electrode is connected to a positive pole of the power supply to serve as an anode, and a water cooling bottom electrode or a side electrode without water cooling provided in the liquid spheroidal graphite cast iron is connected to a negative pole of the power supply.

In the present invention, an induction heating device, a gas or fuel nozzle heating device, an oxygen-gas flame nozzle heating device, a plasma heating device, or all of them may be additionally provided to the furnace body for further heating the liquid spheroidal graphite cast iron. The refractory material of lining of the DC electro-slag pouring furnace device shall be tamped and built with magnesia abundant in MgO or calcined dolomite alkali refractory material, and it is emphasized that refractory material abundant in $SiO_2$ and $Al_2O_3$ shall not be used for tamping. With respect to the above pouring electric furnace device, the composition of the alkali slag covering the top of the liquid iron in the DC electro-slag pouring device is multivariate slag abundant in alkaline earth metal ions such as ($Mg^{2+}$) and ($Ca^{2+}$) or rare-earth metal ions, and the melting point of the slag is controlled in an appropriate range of 1250° C.~1500° C.

Through the electrometallurgic principle of "DC electrolytic cell", the liquid iron after spheroidization serves as a cathode (power is supplied by using the bottom electrode or the side electrode), the graphite electrode inserted into the layer of molten alkali slag serves as an anode, and the molten alkali slag serves as a liquid electrolyte. An electrode level at the slag-metal interface restrains the [Mg] atoms in the liquid spheroidal graphite cast iron from turning into cations due to electron loss and entering the slag; meanwhile, a minute amount of atoms [0] and [S] in the liquid iron may acquire electrons and enter into the slag in form of anions such as ($O^{2-}$) and ($S^{2-}$), which is helpful to keep the spheroidization level of the liquid iron from being decreased, so as to prevent degraded spheroidization.

Anions ($S^{2-}$) residual in the slag and liquid iron may lose electrons near the anode and turn into free-state high temperature liquid sulfur $S_2$, and after floating onto the surface of the high temperature slag, it contact oxygen in the air and is directly oxidized and burnt into gas $SO_2$, then discharged off the furnace directly, which is beneficial to recycle the alkali slag in long-term.

$$2(S^{2-})-4e=(S_2)$$

$$S_2+2O_2=2SO_2\uparrow$$

When potential between different electrodes reaches a certain value large enough, metal cations in the slag will also be separated out on the cathode. For example, under the electrolysis of direct current, cations ($Mg2^+$) and ($Ca2^+$) in the alkali slag on the top of the liquid iron and in the chemical compositions such as MgO, $MgCl_2$, CaO of some dropped linings will also acquire electrons and be restored to [Mg] and [Ca] to enter the liquid iron after contacting the liquid iron serving as the cathode:

$$(Mg^{2+})+2e=[Mg]$$

The liquid spheroidal graphite cast iron insulated in the DC electro-slag furnace greatly reduces the loss of ω(Mg) under the effect of 500 A~5000 A direct current; when a value of ω(Mg) in the liquid iron approaches an electrochemical balance value of the slag-metal interface, the degradation speed of the value of ω(Mg) tends to zero, so that the content of residual magnesium in the liquid iron tends to be stable for a long time, and the range that ω(Mg)>0.025~0.050% as required in the pouring technology can be satisfied, so as to completely eliminate the possibility of degraded spheroidization.

In case the spheroidization ladle brings in a small amount of loose and granular MgS dregs, the MgS dregs can be directly filled into the pouring electric furnace together with the liquid iron without a drossing process, at that time, the granular MgS dregs floating on the top of the slag layer may directly go through a substitution reaction with oxygen in the air under a high temperature:

$$2MgS+O_2=2MgO+S_2$$

$$S_2+2O_2=2SO_2\uparrow$$

The generated MgO enter the slag, so that the work amount of drossing is saved and the waste is recycled, thus metal magnesium for desulfuration in the spheroidization process is recycled in this pouring electric furnace:

$$2MgS+3O_2=2MgO+2SO_2\uparrow$$

The beneficial effect of the present invention is as follows: the present invention converts the spheroidal graphite cast iron from an unstable and lowly reliable material into a highly stable and reliable material, and changes the production process quality control for spheroidal graphite cast iron from inspection before pouring and afterwards guard depending on a person's experience and sense of responsibility to stylized technological regulation of the technological device before and after pouring, so as to solve the problem of property stability of the spheroidal graphite cast iron once for all. In fact, this is a most important technical progress with revolutionary significance in about 50 years since the production technique of the spheroidal graphite cast iron occurred.

The main effects of the DC electro-slag protective pouring electric furnace device are concluded as follows:

①  The structure and the control system of the pouring electric furnace are greatly simplified; the furnace does not need a seal or a periodical drossing treatment, the lining is not thickened gradually, and the device operation becomes simpler; most important of all, the device has a stronger function of retarding degraded spheroidization, even completely avoiding it (theoretically, the spheroidization maintaining time of the liquid iron in the DC electro slag furnace can be prolonged to be infinite), and reduces the consumption of nodulizer, and makes an adding amount thereof tend to be stable, so that the quality control level during the production process of the spheroidal graphite cast iron is greatly improved, and the reliability of material property is increased to an unprecedented degree.

② The high temperature alkali electro-slag has an obvious heating effect on the liquid spheroidal graphite cast iron to prevent the pouring temperature from continuously decreasing along with time lapse, which ensures that the pouring temperature is eligible, stable and of little fluctuation, so as to improve the casts' quality and obviously reduce the rejection loss related to the pouring temperature of the liquid iron (during the casting production of spheroidal graphite cast iron, such type of waste products have wide varieties and occupy a high proportion in the total amount of waste products, the defects include surface blowhole, black slag, slag blister, sand hole, shrinkage porosity, too high hardness, etc. as well as obvious cold shut, misrun, pinhole, disqualification in bulge test, which are all related to the too low pouring temperature).

③ In order to pour spheroidal graphite cast iron castings of large tonnage (e.g., nuclear fuel storage tanks, casts of heavy machine tool, cast of heavy structural parts, etc.), the pouring amount of the liquid iron at one time may be scores of tens or hundreds of tons, and if the conventional spheroidization technological equipment is used to process so much liquid spheroidal graphite cast iron at one time, spheroidization device and melting furnace of especially large tonnage and heavy crown block device shall be added, which is difficult for common enterprises. However, such pouring electric furnace can be used to accumulate enough qualified liquid spheroidal graphite cast iron ladle by ladle, so as to produce heavy spheroidal graphite cast iron castings in the non-heavy casting workshop like ants gnawing at a bone, and the workshop production capacity can be expanded without purchasing devices such as spheroidization ladle for liquid spheroidal graphite cast iron of especially large tonnage and heavy crown block, or improving the load-bearing capacity of the workshop buildings, which brings realistic and important technical and economic significance to many large and medium casting enterprises in China.

As compared with the inert-gas protective pressure pouring electric furnace, the DC electro-slag protective pouring electric furnace has the following advantages:

① The device structure is greatly simplified; particularly, the furnace body and cover of the bottom pouring type and the tilting type electric furnace are not sealed, because inert gas is no longer required for oxygen isolation, and the liquid iron is completely isolated from oxygen in the atmosphere by a thick liquid electro-slag layer floating thereon, so as to "seal" more reliably; the complex pneumatic control servo mechanism is saved, and the device simplification also improves the reliability and reduces the investment, which is convenient for manufacturing, maintenance, lining tamping, and operation control. When the pressure pouring electric furnace is used, the expensive inert gas shall be replaced by the common compressed air, which not only enhances the desulfuration effect, but also reduced the production cost.

② Since the sulfur entering the high temperature electro-slag can be oxidized into gaseous product $SO_2$ and then escape, while the magnesium ion in the slag can be restored under an electrochemical action at the slag-metal interface and then go back to the liquid iron, dregs of magnesium sulfide and magnesium oxide generated in the spheroidizing reaction can be directly put into the pouring electric furnace without going through a drossing process, so that the magnesium element in the slag can be recycled therein to "turn the harmful into the beneficial and waste into valuable". The cancellation of drossing process can also improve labor conditions of the spheroidizing workers, simplify operation process, reduce treating time, increase production efficiency, and save electric energy for heat insulation since a temperature drop of the liquid iron in the ladle is reduced.

Since an electrode potential exists at the slag-metal interface in the electro-slag protective pouring electric furnace, the residual magnesium in the liquid iron will not be decreased when the magnesium content reaches a balanced value, thus the spheroidization process can obviously reduce the adding amount of metal magnesium, so that the amount of residual magnesium of the liquid iron subsequently filled into the pouring electric furnace reaches a normal level $\omega(Mg) < 0.04\% \sim 0.05\%$ from the former level $\omega(Mg) < 0.08\% \sim 0.16\%$. This not only decreases the nodulizer cost, but also solves the problem of lining thickening.

This technical device has a great significance of promotion and application for improving the reliability of spheroidal graphite cast iron, ensuring the long-term continuous and stable production of spheroidal graphite cast iron, and particularly, for enterprises of automobile parts, centrifugal cast pipe, etc. which continuously produce spheroidal graphite cast iron castings on a large scale. With the application and promotion of this technique and the complete solution of reliability problem of the spheroidal graphite cast iron, it is expected that the application range of the spheroidal graphite cast iron will be further extended in the world, the total output of the spheroidal graphite cast iron and its proportion in the ferrous metal castings all over the world will be further increased.

The present invention further provides a processing method for avoiding degradated spheroidization and pouring temperature drop of liquid spheroidal graphite cast iron during pouring process and a special pouring device thereof, so as to stabilize the pouring temperature, completely avoid the degradated spheroidization, and reduce the rejection loss during the production of spheroidal graphite cast iron castings. Meanwhile, since the pouring electric furnace can greatly reduce the loss of residual Mg in the liquid iron, the usage amount of nodulizer is obviously decreased during the spheroidization, and the life of the refractory material of lining is prolonged.

A processing method for avoiding degradated spheroidization and pouring temperature drop of liquid spheroidal graphite cast iron during pouring process, including:

filling liquid spheroidal graphite cast iron to be poured into a special pouring electric furnace device;

paving high temperature molten alkali slag, which is abundant in alkali earth metal ion, rare earth metal ion, or a mixture of them, above the liquid spheroidal graphite cast iron, the temperature of the alkali slag is controlled to be 1500° C.~1700° C.;

connecting the liquid spheroidal graphite cast iron as a cathode to a negative pole of a DC power supply, providing an electrode in the alkali slag and connecting the electrode as an anode to a positive pole of the DC power supply, and using the alkali slag as the liquid electrolyte; and conducting direct current in the special pouring electric furnace device through the DC power supply, the strength of the direct current is determined as follows according to the capacity of the pouring electric furnace device: a current equivalent of 20~50 Faraday for each tone of liquid spheroidal graphite cast iron per hour.

Preferably, the method further including: the electrode provided in the alkali slag is a graphite electrode with a lower end thereof always inserted into the slag for a submerged arc operation; and connecting the alkali slag to the positive pole of the DC power supply, concretely, connecting the alkali slag to the positive pole of the DC power supply through the graphite electrode.

Preferably, the melting point of the alkali slag is 1250° C.~1550° C., and the alkalinity is 2.5~4.0.

A pouring electric furnace for avoiding degradated spheroidization and pouring temperature drop of liquid spheroidal graphite cast iron during pouring process, including: a furnace body, a pouring tap hole and a feeding iron-inlet provided on the furnace body, and a DC power supply, so that the liquid spheroidal graphite cast iron is connected to a negative pole of the DC power supply through an electrode provided in the liquid spheroidal graphite cast iron in the furnace body; high temperature molten alkali slag, which is abundant in alkali earth metal ion, rare earth metal ion, or a mixture of them, is paved above the liquid spheroidal graphite cast iron; a positive pole of the DC power supply is connected to the alkali slag through an electrode provided in the alkali slag.

Preferably, the furnace body is a bottom pouring type furnace body, an air pressure type furnace body, or a tilting type furnace body.

Preferably, the electrode provided in the alkali slag is a graphite electrode.

Preferably, the refractory material of lining of the furnace body is magnesia alkali refractory material containing MgO, calcined dolomite alkali refractory material, magnesia containing MgO and magnesia carbon brick alkali refractory material, or calcined dolomite and magnesia carbon brick alkali refractory material.

Preferably, the liquid iron may be heated and insulated in the furnace body just by means of high temperature electro-slag, or at least one auxiliary heating device may be additionally provided in the furnace body to heat the slag and the liquid spheroidal graphite cast iron; the auxiliary heating device may be an induction heating device heating the liquid spheroidal graphite cast iron, or a gas nozzle heating device, a fuel nozzle heating device, an oxygen-gas flame nozzle heating device, a plasma heating device auxiliarily heating the liquid iron and the alkali slag, and it may be any one of the above auxiliary heating devices, or any combination of two or more of those auxiliary heating devices.

With the above processing method and special pouring device thereof for avoiding degradated spheroidization and pouring temperature drop of liquid spheroidal graphite cast iron during pouring process, since the high temperature molten alkali slag abundant in alkali earth metal ions, rare earth metal ions, or a mixture of them, is paved above the liquid spheroidal graphite cast iron, and current is conducted in the liquid spheroidal graphite cast iron and slag, the alkali earth metal ions or rare earth metal ions in the slag will move towards the liquid spheroidal graphite cast iron under the effect of the current, thus, even if the alkali earth metal ions or rare earth metal ions in the liquid spheroidal graphite cast iron to be poured are vaporized and reduced, they still can be supplemented by the alkali earth metal ions or rare earth metal ions in the slag, so as to ensure the content of the alkali earth metal ions or rare earth metal ions in the in the liquid spheroidal graphite cast iron, decease the degradated spheroidization, and improve the mechanical properties of the poured castings.

Meanwhile, since the alkali earth metal ions or rare earth metal ions can move into the liquid spheroidal graphite cast iron under the effect of the current, the liquid spheroidal graphite cast iron can be heated and insulated; the content of alkali earth metal ions or rare earth metal ions in the liquid spheroidal graphite cast iron is maintained by supplementing alkali earth metal ions or rare earth metal ions from the slag into the liquid spheroidal graphite cast iron, and the degradated spheroidization is depressed. Since measures for heating and insulating are taken, the rejection rate related to the pouring temperature can be reduced.

Similarly, since the alkali earth metal ions or rare earth metal ions in the slag are supplemented into the liquid spheroidal graphite cast iron, it is unnecessary to increase the content of alkali earth metal ions or rare earth metal ions in the liquid spheroidal graphite cast iron newly added into the furnace, which not only reduces the consumption of alkali earth metal ions or rare earth metal ions, but also avoids a reaction between excessive alkali earth metal ions or rare earth metal ions in the liquid spheroidal graphite cast iron and the lining of the electric furnace, so as to reduce the maintenance frequency of the lining of the electric furnace.

BRIEF DESCRIPTIONS OF THE DRAWINGS

In order to describe the embodiments of the present invention or the technical solutions in the prior art more clearly, the accompanied drawings to be used in the descriptions of the embodiments or the prior art will be briefly introduced as follows. Apparently, the drawings described are just some embodiments of the present invention, and a person skilled in the art can acquire other drawings based on these drawings without paying any creative effort.

DETAILED DESCRIPTIONS OF THE EMBODIMENTS

Figure 1:
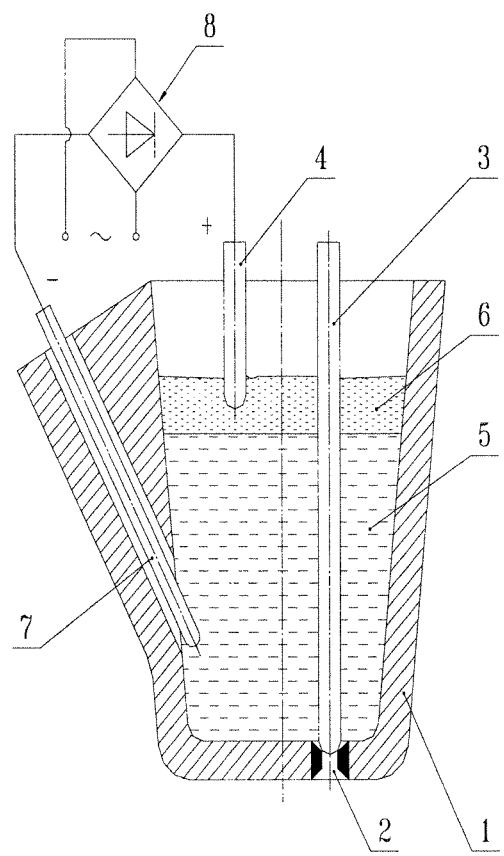
FIG. 1 is a structural diagram of a bottom pouring type pouring electric furnace according to Embodiment 2 of the present invention.

The technical solutions of the embodiments of the present invention will be clearly and completely described as follows in conjunction with the drawings. Apparently, the embodiments described are just some embodiments of the present invention, instead of all the embodiments. Any other embodiment acquired by a person skilled in the art based on the embodiments of the present invention without paying any creative effort, shall fall within the protection scope of the present invention.

Embodiment 1

The pouring method of spheroidal graphite cast iron provided in the embodiment of the present invention fills the liquid spheroidal graphite cast iron to be poured into a pouring electric furnace, and paves high temperature molten alkali slag, which is abundant in alkali earth metal ion, rare earth metal ion, or a mixture of them, above the liquid spheroidal graphite cast iron in the pouring electric furnace; at the same time, the upper part of the pouring electric furnace is provided with an graphite electrode inserted into the slag, and an electrode connected to the power supply is provided in the liquid spheroidal graphite cast iron. Next, the graphite electrode is connected to the positive pole of the power supply, the liquid spheroidal graphite cast iron is connected to the negative pole of the power supply, and a low voltage large current DC source is connected. The current strength of the DC source is determined as follows according to the capacity of the electric furnace: a current equivalent of 20~50 Faraday for each tone of liquid spheroidal graphite cast iron per hour, here the low voltage large current refers to low voltage about 20V~70V commonly used in industries, and its current varies with the total power in a certain range.

The above solution conducts current between the liquid spheroidal graphite cast iron and the slag to form a DC electrolytic cell, wherein the liquid spheroidal graphite cast iron is used as the cathode, the graphite electrode inserted into the slag is used as anode, and the molten slag is used as the liquid electrolyte; after the DC electrolytic cell is powered on, cations such as ($Mg^{2+}$) and ($Ca^{2+}$) in the slag directionally move towards the cathode, while anions such as ($S^{2-}$) in the slag move towards the anode; residual anions such as [$S^{2-}$] in the liquid spheroidal graphite cast iron will also float and enter the slag due to the attraction of oppositely charged electrode.

As can be seen from the above analysis, anions such as [$S^{2-}$] in the slag and liquid spheroidal graphite cast iron all move towards the anode located in high temperature slag, thus anions such as [$S^{2-}$] usually move into the high temperature slag, while these anions such as [$S^{2-}$] may lose electrons near the anode and become free-state high temperature liquid sulfur, and directly burns into gas SO2 after contacting the air, so as to continuously eliminate anions such as [$S^{2-}$] in the liquid spheroidal graphite cast iron and the slag. The detailed chemical reaction is as follows:

$$2(S^{2-})-4e=(S_2)$$

$$S_2+2O_2=2SO_2\uparrow$$

At the same time, since cations such as ($Mg^{2+}$) and ($Ca^{2+}$) in the slag directionally move towards the cathode, they usually move into the high temperature liquid spheroidal graphite cast iron, acquire electrons near the cathode to turn into free-state magnesium and calcium, and supplement active metals into the liquid spheroidal graphite cast iron; furthermore, these active metals may serve as nodulizer in the liquid spheroidal graphite cast iron, thus nodulizer in the liquid spheroidal graphite cast iron is supplemented and degradated spheroidization is prevented. The detailed chemical formula is as follows:

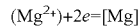

$$(Mg^{2+})+2e=[Mg]$$

The magnesium metal in the liquid spheroidal graphite cast iron may be supplemented by restoring the magnesium ions in the slag while escaping through gasification; the gasified magnesium metal in the liquid spheroidal graphite cast iron burns into magnesium ions when reaching the interface between the liquid spheroidal graphite cast iron and the slag, and goes back to the liquid spheroidal graphite cast iron under the effect of current so long as it is not separated from the alkali slag; thus, the content of the magnesium metal serving as nodulizer in the liquid spheroidal graphite cast iron is balanced.

That is to say, when enough direct current is conducted, an electrode potential of the interface between the slag and the liquid spheroidal graphite cast iron (slag-metal interface) will achieve an electro-chemical balance meeting the requirement of spheroidization technology, between the content of free-state Mg in the liquid spheroidal graphite cast iron and the content of ionic state ($Mg^{2+}$) in the slag, which restrains Mg atoms in the liquid spheroidal graphite cast iron from turning into $Mg^{2+}$ cation due to electron loss and entering the slag, so as to keep the content of residual Mg in the liquid spheroidal graphite cast iron.

In case a ladle of liquid spheroidal graphite cast iron with a low content of residual Mg and having undergone the degradated spheroidization is filled into the furnace inadvertently, and causes the entire content of residual magnesium in the liquid spheroidal graphite cast iron in the pouring electric furnace to decrease, the magnesium element in the slag can be supplemented into the liquid spheroidal graphite cast iron to increase the content of magnesium in the liquid spheroidal graphite cast iron and restore it to the normal value.

The slag in the embodiment of the invention not only supplements magnesium required in the liquid spheroidal graphite cast iron, but also has a sealing function. In details, the liquid spheroidal graphite cast iron in this embodiment is sealed by the high temperature slag floating on the top thereof, so as to completely isolate the liquid spheroidal graphite cast iron in the furnace from the oxygen in the atmosphere, and prevent the degradated spheroidization caused by a resulfurization due to an oxidation of the liquid spheroidal graphite cast iron.

Since measures of high temperature electro-slag heating and insulation are taken, the rejection rate related to the pouring temperature is reduced.

The method of the present invention does not need to increase the content of nodulizer in the liquid spheroidal graphite cast iron newly added into the furnace, and it not only reduces the consumption of nodulizer, but also avoid a reaction between excessive nodulizer in the liquid spheroidal graphite cast iron and the lining of the electric furnace, so as to reduce the maintenance frequency of the electric furnace lining.

The melting point of the slag in the embodiment of the present invention is 1250° C.~1550° C., so that the slag is kept in a liquid state in the pouring electric furnace to serve as the electrolytic solution.

The embodiment of the present invention provides a spheroidal graphite cast iron pouring electric furnace, including a furnace body, a pouring tap hole and a feeding iron-inlet provided on the furnace body, and means in sets for quantifying poured liquid spheroidal graphite cast iron, the structure of the furnace body may be bottom pouring type, air pressure type or tilting type.

The upper part of the furnace body in the embodiment of the present invention is provided with a graphite electrode, high temperature slag abundant in active metal ions such as $Mg^{2+}$, $Ca^{2+}$ is paved above the liquid spheroidal graphite cast iron in the furnace, the liquid spheroidal graphite cast iron in the pouring electric furnace is connected to the water cooling bottom electrode or side electrode of the electric furnace to serve as the cathode, the lower end of the graphite electrode serving as the anode is always inserted into the slag (submerged arc operation); the spheroidal graphite cast iron pouring electric furnace is further provided with a power supply, in which an anode thereof is connected to the upper end of the graphite electrode, and a cathode thereof is connected to the electrode provided in the liquid spheroidal graphite cast iron.

Embodiment 2

This embodiment takes the bottom pouring type furnace body as an example to detailedly describe the structure of the spheroidal graphite cast iron pouring electric furnace according to the embodiment of the present invention in conjunction with the drawings. As illustrated in FIG. 1, the spheroidal graphite cast iron pouring electric furnace according to the embodiment of the present invention includes a pouring furnace body 1 and a sprue gate 2, an opening at the upper end of the furnace body is a feed inlet, and the sprue gate 2 is provided with a stopper rod 3. Liquid spheroidal graphite cast iron 5 is added into the furnace through the feed inlet at the upper end of the furnace body 1, high temperature slag 6 abundant in active metal ions such as $Mg^{2+}$ and $Ca^{2+}$ is paved above the liquid spheroidal graphite cast iron 5, and a side-insertion electrode 7 capable of stretching into the liquid spheroidal graphite cast iron 5 is provided at the side of the furnace body 1; meanwhile, a graphite electrode 4 is provided on the furnace body 1 and controlled by an automatic lift device to keep the lower end of the graphite electrode 4 always being submerged into the slag 6. The spheroidal graphite cast iron pouring electric furnace in the embodiment of the present invention is further provided with a DC power supply system 8 having a positive pole connected to the upper end of the graphite electrode 4 to use it as the anode, and a negative pole connected to the side-insertion electrode 7 to use the liquid spheroidal graphite cast iron as the cathode.

In the above solution, current is conducted between the liquid spheroidal graphite cast iron and the slag to form a DC electrolytic cell, in which: the liquid spheroidal graphite cast iron serves as the cathode, the graphite electrode inserted into the slag serves as the anode, and the molten slag serves as the liquid electrolyte; after the DC electrolytic cell is powered on, cations such as ($Mg^{2+}$) and ($Ca^{2+}$) in the slag directionally move towards the cathode, while anions such as ($S^{2-}$) in the slag move towards the anode; residual anions such as $[S^{2-}]$ in the liquid spheroidal graphite cast iron will also float and enter the slag due to an attraction of oppositely charged electrode and a discharge thereby.

As can be seen from the above analysis, anions such as $[S^{2-}]$ in the slag and liquid spheroidal graphite cast iron all move towards the anode located in high temperature slag, thus anions such as $[S^{2-}]$ usually move into the high temperature slag, while these anions such as $[S^{2-}]$ may lose electrons near the anode and become free-state high temperature liquid sulfur, and directly burns into gas $SO_2$ after contacting the air, so as to continuously eliminate anions such as [$S^{2-}$] in the liquid spheroidal graphite cast iron and the slag. The detailed chemical reaction is as follows:

$$2(S^{2-})-4e=(S_2)$$

$$S_2+2O_2=2SO_2\uparrow$$

At the same time, since cations such as ($Mg^{2+}$) and ($Ca^{2+}$) in the slag directionally move towards the cathode, they usually move into the high temperature liquid spheroidal graphite cast iron, acquire electrons near the cathode to turn into free-state magnesium and calcium, and supplement active metals into the liquid spheroidal graphite cast iron; furthermore, these active metals may serve as nodulizer in the liquid spheroidal graphite cast iron, thus nodulizer in the liquid spheroidal graphite cast iron is supplemented and degradated spheroidization is prevented. The detailed chemical formula is as follows:

$$(Mg^{2+})+2e=[Mg]$$

The magnesium metal in the liquid spheroidal graphite cast iron may be supplemented by restoring the magnesium ions in the slag while escaping through gasification; the gasified magnesium metal in the liquid spheroidal graphite cast iron burns into magnesium ions when reaching the interface between the liquid spheroidal graphite cast iron and the slag, and goes back to the liquid spheroidal graphite cast iron under the effect of current so long as it is not separated from the alkali slag; thus, the content of the magnesium metal serving as nodulizer in the liquid spheroidal graphite cast iron is balanced.

The liquid spheroidal graphite cast iron insulated in the DC electro-slag furnace greatly reduces the loss of ω(Mg) under the effect of 500 A ~5000 A direct current; when a value of ω(Mg) in the liquid spheroidal graphite cast iron approaches an electrochemical balance value of the interface between the liquid spheroidal graphite cast iron and the slag, the degradation speed of the value of ω(Mg) in the liquid spheroidal graphite cast iron tends to zero, so that the content of residual magnesium in the liquid spheroidal graphite cast iron tends to be stable, and the range that ω(Mg)>0.030~0.050% as required in the pouring technology can be satisfied, so as to eliminate the possibility of degradated spheroidization.

In case the spheroidization ladle brings in a small amount of loose and granular MgS dregs, the MgS dregs can be directly filled into the pouring electric furnace together with the liquid spheroidal graphite cast iron without a drossing process, at that time, the granular MgS dregs floating on the top of the slag layer may directly go through a substitution reaction with oxygen in the air under a high temperature:

$$2MgS+O_2=2MgO+S_2$$

$$S_2+2O_2=2SO2\uparrow$$

The generated MgO enter the slag, so that the work amount of drossing is saved and the waste is recycled, thus metal magnesium for desulfuration in the spheroidization process is recycled in this pouring electric furnace:

$$2MgS+3O_2=2MgO+2SO_2\uparrow$$

The embodiment of the present invention may additionally provide in the furnace body at least one auxiliary heating device, which is an induction heating device, a gas nozzle heating device, a fuel nozzle heating device, an oxygen-gas flame nozzle heating device, or a plasma heating device heating the slag and liquid spheroidal graphite cast iron.

In the embodiment of the present invention, the refractory material of lining in the furnace body is preferably tamped and built with magnesia alkali refractory material abundant in MgO, calcined dolomite alkali refractory material, magnesia containing MgO and magnesia carbon brick alkali refractory material, or calcined dolomite and magnesia carbon brick alkali refractory material; and it is emphasized that the refractory material abundant in $SiO_2$ and $Al_2O_3$ shall not be used.

In order that the magnesium in the slag is attracted to the bottom of the liquid spheroidal graphite cast iron so far as possible, the negative pole of the power supply in the embodiment of the present invention is connected to the bottom of the liquid spheroidal graphite cast iron, and the positive pole thereof is connected to the top of the slag.

With respect to the above pouring electric furnace device, the composition of the slag covering the top of the liquid spheroidal graphite cast iron in the DC electro-slag pouring device is multivariate slag abundant in active metal ions such as ($Mg^{2+}$) and ($Ca^2$), and the melting point of the slag is controlled in an appropriate range of 1250° C.~1500° C.

The embodiment of the present invention uses the graphite to connect the slag to the positive pole of the power supply, and in practical applications, the slag may be connected to the positive pole of the power supply in other ways not limited to graphite.

Figure 2:
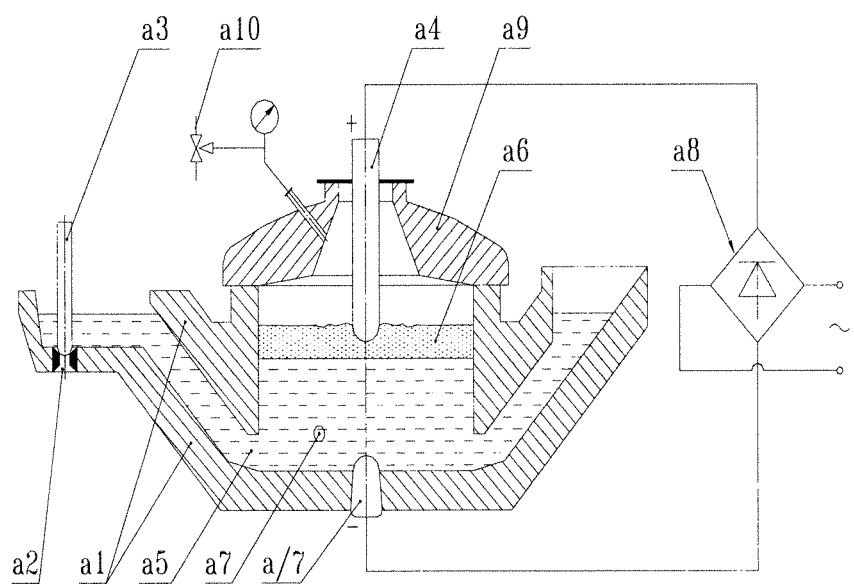
FIG. 2 is a structural diagram of an air pressure type pouring electric furnace according to Embodiment 3 of the present invention.

Embodiment 3:

This embodiment takes the air pressure type furnace body as an example to detailedly describe the structure of the spheroidal graphite cast iron pouring electric furnace according to the embodiment of the present invention in conjunction with the drawings, and the sealed furnace uses compressed air abundant in oxygen, instead of nitrogen or argon. As illustrated in FIG. 2, the spheroidal graphite cast iron pouring electric furnace according to the embodiment of the present invention includes a furnace body a1 and a sprue gate a2 provided on the furnace body a1, and the sprue gate a2 is provided with a stopper rod a3. Liquid spheroidal graphite cast iron a5 is added into the furnace through the feed inlet at the right side of the furnace body a1, high temperature slag a6 abundant in active metal ions such as $Mg^{2+}$ and $Ca^{2+}$ is paved above the liquid spheroidal graphite cast iron a5, and a bottom electrode a\7 is provided in the liquid spheroidal graphite cast iron a5; meanwhile, a graphite electrode a4 is provided on a cover a9 at the upper part of the furnace body a1 and controlled by an automatic lift device to keep the lower end of the graphite electrode a4 always being submerged into the slag a6. The spheroidal graphite cast iron pouring electric furnace in the embodiment of the present invention is further provided with a DC power supply system a8 having an anode connected to the upper end of the graphite electrode a4, and a cathode connected to the bottom electrode a\7.

At the same time, the cover a9 in this embodiment is further provided with a compressed air discharge system a10, through which the liquid spheroidal graphite cast iron in the furnace body is controlled to flow to the sprue gate a2, or the liquid spheroidal graphite cast iron is allowed to be added from the feed inlet.

The embodiment of the present invention adopts the bottom electrode a\7, but in practical applications, the side-insertion electrode same as that in Embodiment 2 can also be used, and please see a7 in FIG. 2 for details.

The solution of this embodiment has a working principle completely same as that in Embodiment 2 and can achieve the same effect. Thus the pouring temperature is stabled, the degradated spheroidization is suppressed, and consumption of nodulizer is reduced.

In the embodiment of the present invention, the liquid spheroidal graphite cast iron may be heated and insulated in the furnace body just by means of the high temperature molten electro-slag, or at least one auxiliary heating device may be additionally provided in the furnace body to heat the slag and the liquid spheroidal graphite cast iron. The auxiliary heating device may be an induction heating device heating the liquid spheroidal graphite cast iron, or a gas nozzle heating device, a fuel nozzle heating device, an oxygen-gas flame nozzle heating device, a plasma heating device auxiliarily heating the liquid iron and the alkali slag, and it may be any one of the above auxiliary heating devices, or a combination of two or more of those auxiliary heating devices.

In the embodiment of the present invention, the refractory material of lining in the furnace body is preferably tamped and built with magnesia alkali refractory material abundant in MgO, calcined dolomite alkali refractory material, magnesia containing MgO and magnesia carbon brick alkali refractory material, or calcined dolomite and magnesia carbon brick alkali refractory material; and it is emphasized that the refractory material abundant in $SiO_2$ and $Al_2O_3$ shall not be used.

With respect to the above pouring electric furnace device, the composition of the slag covering the top of the liquid spheroidal graphite cast iron in the DC electro-slag pouring device is multivariate slag abundant in active metal ions such as ($Mg^{2+}$) and ($Ca^{2+}$), and the melting point of the slag is controlled in an appropriate range of 1250° C.~1500° C.

The embodiment of the present invention uses the graphite to connect the slag to the positive pole of the power supply, and in practical applications, the slag may be connected to the positive pole of the power supply in other ways not limited to graphite.

Embodiment 4

Figure 3:
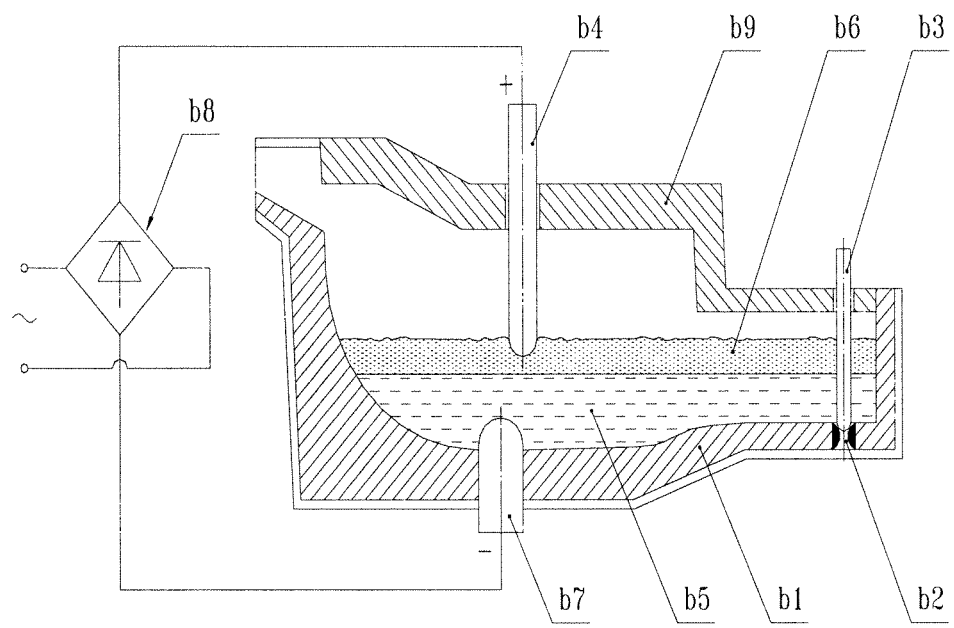
FIG. 3 is a structural diagram of a tilting type pouring electric furnace according to Embodiment 4 of the present invention.

This embodiment takes the tilting type furnace body as an example to detailedly describe the structure of the spheroidal graphite cast iron pouring electric furnace according to the embodiment of the present invention in conjunction with the drawings. As illustrated in FIG. 3, the spheroidal graphite cast iron pouring electric furnace according to the embodiment of the present invention includes a furnace body b1 and a sprue gate b2 provided on the furnace body b1, and the sprue gate b2 is provided with a stopper rod b3. Liquid spheroidal graphite cast iron b5 is added into the furnace through the feed inlet at the left side of the furnace body b1, high temperature slag b6 abundant in active metal ions such as $Mg^{2+}$ and $Ca^{2+}$ is paved above the liquid spheroidal graphite cast iron b5, and a bottom electrode b7 is provided in the liquid spheroidal graphite cast iron b5; meanwhile, a graphite electrode b4 is provided on a cover b9 at the upper part of the furnace body b1 and controlled by an automatic lift device to keep the lower end of the graphite electrode b4 always being submerged into the slag b6. The spheroidal graphite cast iron pouring electric furnace in the embodiment of the present invention is further provided with a DC power supply system b8 having an anode connected to the upper end of the graphite electrode b4, and a cathode connected to the bottom electrode b7.

The embodiment of the present invention adopts the bottom electrode b7, but in practical applications, the side-insertion electrode same as that in Embodiment 2 can also be used.

The solution of this embodiment has a working principle completely same as that in Embodiment 2 and can achieve the same effect. Thus the pouring temperature is stabled, the degradated spheroidization is suppressed, and consumption of nodulizer is reduced.

In the embodiment of the present invention, the liquid spheroidal graphite cast iron may be heated and insulated in the furnace body just by means of the high temperature molten electro-slag, or at least one auxiliary heating device may be additionally provided in the furnace body to heat the slag and the liquid spheroidal graphite cast iron. The auxiliary heating device may be an induction heating device heating the liquid spheroidal graphite cast iron, or a gas nozzle heating device, a fuel nozzle heating device, an oxygen-gas flame nozzle heating device, a plasma heating device auxiliarily heating the liquid iron and the alkali slag, and it may be any one of the above auxiliary heating devices, or a combination of two or more of those auxiliary heating devices.

In the embodiment of the present invention, the refractory material of lining in the furnace body is preferably tamped and built with magnesia abundant in MgO or calcined dolomite alkali refractory material; and it is emphasized that the refractory material abundant in $SiO_2$ and $Al_2O_3$ shall not be used.

With respect to the above pouring electric furnace device, the composition of the slag covering the top of the liquid spheroidal graphite cast iron in the DC electro-slag pouring device is multivariate slag abundant in active metal ions such as ($Mg^{2+}$) and ($Ca^{2+}$), and the melting point of the slag is controlled in an appropriate range of 1250° C.~1500° C.

The embodiment of the present invention uses the graphite to connect the slag to the positive pole of the power supply, and in practical applications, the slag may be connected to the positive pole of the power supply in other ways not limited to graphite.

The main effects of the spheroidal graphite cast iron pouring electric furnace provided in the above four embodiments include:

① The structure and the control system of the pouring electric furnace are greatly simplified; the furnace does not need a seal or a periodical drossing treatment, the lining is not thickened gradually, and the device operation becomes simpler; more important of all, the device has a stronger function of retarding degradated spheroidization, even completely avoiding it (theoretically, the spheroidization maintaining time of the liquid spheroidal graphite cast iron in the DC electro slag furnace can be prolonged to be infinite), and reduces the consumption of nodulizer to make an adding amount thereof tend to be stable, so that the quality control level of production process of spheroidal graphite cast iron material is greatly improved, and the reliability of material property is increased to an unprecedented degree.

② The high temperature molten alkali electro-slag also heats the liquid spheroidal graphite cast iron to prevent the pouring temperature from continuously decreasing along with time lapse, which ensures that the pouring temperature is eligible, stable and of little fluctuation, so as to improve the cast quality and obviously reduce the rejection loss related to the pouring temperature of the liquid spheroidal graphite cast iron (during the casting production of spheroidal graphite cast iron castings, such type of waste products have wide varieties and occupy a high proportion in the total amount of waste products, the defects include surface blowhole, black slag, slag blister, sand hole, shrinkage porosity, too high hardness, etc. as well as obvious cold shut, misrun, pinhole, disqualification in bulge test, which are all related to the too low pouring temperature).

③ In order to pour spheroidal graphite cast iron castings of large tonnage (e.g., heavy structural parts, nuclear fuel storage tanks, etc.), the pouring amount of the liquid spheroidal graphite cast iron at one time may be scores of tens or hundreds of tons, and if the conventional spheroidization technological equipment is used to process so much liquid spheroidal graphite cast iron at one time, spheroidization device of especially large tonnage and heavy crown block device shall be added, which is difficult for common enterprises. However, such pouring electric furnace can be used to accumulate enough qualified liquid spheroidal graphite cast iron ladle by ladle, so as to produce heavy spheroidal graphite cast iron castings in the non-heavy casting workshop like ants gnawing at a bone, and the workshop production capacity can be expanded without purchasing devices such as spheroidization ladle for liquid spheroidal graphite cast iron of especially large tonnage and heavy crown block, or improving the load-bearing capacity of the workshop buildings, which brings realistic and important technical and economic significance to many large and medium casting enterprises.

As compared with the inert-gas protective pressure pouring electric furnace, the spheroidal graphite cast iron pouring electric furnace provided in the above embodiments has the following advantages:

① The device structure is greatly simplified; the furnace body and cover are not sealed, thus the complex pneumatic control servo mechanism is not required, instead, the liquid spheroidal graphite cast iron is completely isolated from oxygen in the atmosphere by a thick liquid electro-slag layer floating thereon, so as to "seal" more reliably; the device simplification also improves the reliability and reduces the investment, which is convenient for manufacturing, maintenance, lining tamping, and operation control.

② Since the sulfur entering the high temperature slag can be oxidized into gaseous product $SO_2$ and then escape, while the magnesium ion in the slag can be restored under an electrochemical action at the slag-metal interface and then go back to the liquid spheroidal graphite cast iron, dregs of magnesium sulfide and magnesium oxide generated in the spheroidizing reaction can be directly put into the pouring electric furnace without going through a drossing process, so that the magnesium element in the slag can be recycled therein to "turn the harmful into the beneficial and waste into valuable". The cancellation of drossing process can also improve labor conditions of the spheroidizing workers, simplify operation process, reduce treating time, increase production efficiency, and save electric energy for heat insulation since a temperature drop of the liquid spheroidal graphite cast iron in the ladle is reduced.

Since an electrode potential exists at the slag-metal interface in the electro-slag protective pouring electric furnace, the residual magnesium in the liquid spheroidal graphite cast iron will not be lost when the magnesium content reaches a balanced value, thus the spheroidization process can obviously reduce the adding amount of metal magnesium, so that the amount of residual magnesium of the liquid spheroidal graphite cast iron entering the pouring furnace reaches a normal level $\omega(Mg)<0.04\%\sim0.05\%$. This not only decreases the nodulizer cost, but also solves the problem of lining thickening.

This technical device has a great significance of promotion and application for improving the reliability of spheroidal graphite cast iron, ensuring the long-term continuous and stable production of spheroidal graphite cast iron, and particularly, for enterprises of automobile parts, centrifugal cast pipe, etc. which continuously produce spheroidal graphite cast iron castings on a large scale.

The above descriptions are just embodiments of the present invention, but the protection scope of the present invention is not limited thereto. Any change or substitution that can be easily conceived by a person skilled in the art within the technical range of the disclosure of the present invention shall be covered by the protection scope of the present invention. Therefore, the protection scope of the present invention shall be subject to the protection scope of the claims.

The invention claimed is:

1. A pouring electric furnace for avoiding degradated spheroidization and pouring temperature drop of liquid spheroidal graphite cast iron during pouring process, comprising:
a furnace body,
a pouring tap hole and a feeding iron-inlet provided on the furnace body, characterized in that, the furnace body has at least one auxiliary heating device to heat the slag and the liquid spheroidal graphite cast iron, and the pouring electric furnace further comprising a DC power supply, so that the liquid spheroidal graphite cast iron serves as a cathode by being connected to a negative pole of the DC power supply through a water cooling bottom electrode or side electrode provided in the liquid spheroidal graphite cast iron in the furnace body;
high temperature molten alkali slag, which is abundant in alkali earth metal ion, rare earth metal ion, or a mixture of them, is paved above the liquid spheroidal graphite cast iron and completely covers the surface of the liquid spheroidal cast iron so that the liquid spheroidal graphite cast iron is completely isolated from oxygen in the atmosphere, a positive pole of the DC power supply is connected to the alkali slag through an electrode provided in the alkali slag.

2. The pouring electric furnace for avoiding degradated spheroidization and pouring temperature drop of liquid spheroidal graphite cast iron during pouring process according to claim 1, characterized in that, the furnace body is a bottom pouring type furnace body, an air pressure type furnace body, or a tilting type furnace body.

3. The pouring electric furnace for avoiding degradated spheroidization and pouring temperature drop of liquid spheroidal graphite cast iron during pouring process according to claim 2, characterized in that, the auxiliary heating device is an induction heating device heating the liquid spheroidal graphite cast iron, or a gas nozzle heating device, a fuel nozzle heating device, an oxygen-gas flame nozzle heating device, a plasma heating device auxiliarily heating the liquid iron and the alkali slag, and it is any one of the above auxiliary heating devices, or any combination of two or more of those auxiliary heating devices.

4. The pouring electric furnace for avoiding degradated spheroidization and pouring temperature drop of liquid spheroidal graphite cast iron during pouring process according to claim 1, characterized in that, the electrode provided in the alkali slag is a graphite electrode.

5. The pouring electric furnace for avoiding degradated spheroidization and pouring temperature drop of liquid spheroidal graphite cast iron during pouring process according to claim 4, characterized in that, the auxiliary heating device is an induction heating device heating the liquid spheroidal graphite cast iron, or a gas nozzle heating device, a fuel nozzle heating device, an oxygen-gas flame nozzle heating device, a plasma heating device auxiliarily heating the liquid iron and the alkali slag, and it is any one of the above auxiliary heating devices, or any combination of two or more of those auxiliary heating devices.

6. The pouring electric furnace for avoiding degradated spheroidization and pouring temperature drop of liquid spheroidal graphite cast iron during pouring process according to claim 1, characterized in that, the refractory material of lining of the furnace body is magnesia alkali refractory material containing MgO, calcined dolomite alkali refractory material, magnesia containing MgO and magnesia carbon brick alkali refractory material, or calcined dolomite and magnesia carbon brick alkali refractory material; it is emphasized that refractory material abundant in $SiO_2$ and $Al_2O_3$ shall not be used for tamping.

7. The pouring electric furnace for avoiding degradated spheroidization and pouring temperature drop of liquid spheroidal graphite cast iron during pouring process according to claim 6, characterized in that, the auxiliary heating device is an induction heating device heating the liquid spheroidal graphite cast iron, or a gas nozzle heating device, a fuel nozzle heating device, an oxygen-gas flame nozzle heating device, a plasma heating device auxiliarily heating the liquid iron and the alkali slag, and it is any one of the above auxiliary heating devices, or any combination of two or more of those auxiliary heating devices.

8. The pouring electric furnace for avoiding degradated spheroidization and pouring temperature drop of liquid spheroidal graphite cast iron during pouring process according to claim 1, characterized in that, the auxiliary heating device is an induction heating device heating the liquid spheroidal graphite cast iron, or a gas nozzle heating device, a fuel nozzle heating device, an oxygen-gas flame nozzle heating device, a plasma heating device auxiliarily heating the liquid iron and the alkali slag, and it is any one of the above auxiliary heating devices, or any combination of two or more of those auxiliary heating devices.

* * * * *